United States Patent
Hikawa et al.

(10) Patent No.: US 7,551,303 B2
(45) Date of Patent: Jun. 23, 2009

(54) SERVICE PROCESSING DEVICE AND METHOD

(75) Inventors: Yuji Hikawa, Ebina (JP); Yukio Tajima, Ebina (JP); Kazuko Kirihara, Ebina (JP); Akihiro Enomoto, Ebina (JP); Hidekazu Ozawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1041 days.

(21) Appl. No.: 10/725,408

(22) Filed: Dec. 3, 2003

(65) Prior Publication Data

US 2005/0027825 A1 Feb. 3, 2005

(30) Foreign Application Priority Data

Mar. 24, 2003 (JP) .............................. 2003-079269

(51) Int. Cl.
G06F 3/12 (2006.01)
G06F 3/00 (2006.01)

(52) U.S. Cl. ................... 358/1.15; 358/1.13; 358/1.16; 358/403; 358/407; 707/10; 709/219; 709/220; 709/224; 710/15; 710/16; 710/18; 710/19

(58) Field of Classification Search ................ 358/1.14, 358/1.15; 709/219, 220, 224; 707/10
See application file for complete search history.

(56) References Cited

U.S. PATENT DOCUMENTS

| | | | | |
|---|---|---|---|---|
| 5,220,674 A | * | 6/1993 | Morgan et al. | 709/223 |
| 5,467,434 A | * | 11/1995 | Hower, Jr. et al. | 358/1.15 |
| 5,625,757 A | * | 4/1997 | Kageyama et al. | 358/1.14 |
| 5,689,625 A | * | 11/1997 | Austin et al. | 358/1.15 |
| 5,761,396 A | * | 6/1998 | Austin et al. | 358/1.15 |
| 5,859,711 A | * | 1/1999 | Barry et al. | 358/296 |
| 5,974,234 A | * | 10/1999 | Levine et al. | 358/1.16 |
| 6,029,238 A | * | 2/2000 | Furukawa | 712/1 |
| 6,182,136 B1 | * | 1/2001 | Ramanathan et al. | 709/224 |
| 6,369,909 B1 | * | 4/2002 | Shima | 358/1.15 |
| 6,502,147 B2 | * | 12/2002 | Reilly | 710/104 |

(Continued)

FOREIGN PATENT DOCUMENTS

JP A-06-110629 4/1994

(Continued)

Primary Examiner—King Y Poon
Assistant Examiner—Richard Z Zhu
(74) Attorney, Agent, or Firm—Oliff & Berridge, PLC

(57) ABSTRACT

A plurality of equipment connected to a network are linked with each other to perform plural processing operations to document data. When, for example, a user defines a desired service linkage job flow by using, for example, a GUI screen displayed on a client terminal, job flow information is transmitted to a script creation server, and a script is created in which processing contents and a storage location of a document as a processing object are defined. The created script can be stored in a storage unit such as, for example, a script management server. When the user selects a desired script among plural scripts stored in the script management server, the selected script is transmitted to a linkage processing server. The linkage processing server interprets the script, makes a processing request to respective devices such as, for example, an image processing device so that the document is processed in accordance with the processing contents described in the script, and links the devices with each other to perform plural processing operations.

32 Claims, 10 Drawing Sheets

U.S. PATENT DOCUMENTS

| | | | |
|---|---|---|---|
| 6,775,023 B1 * | 8/2004 | Fukunaga et al. | 358/1.15 |
| 6,785,015 B1 * | 8/2004 | Smith et al. | 358/1.15 |
| 6,822,754 B1 * | 11/2004 | Shiohara | 358/1.15 |
| 6,961,144 B2 * | 11/2005 | Usami | 358/1.15 |
| 6,970,261 B1 * | 11/2005 | Robles | 358/1.15 |
| 7,136,941 B2 * | 11/2006 | Nguyen et al. | 710/15 |
| 7,143,150 B1 * | 11/2006 | Nuggehalli | 709/221 |
| 7,146,413 B2 * | 12/2006 | Spitzer et al. | 709/220 |

FOREIGN PATENT DOCUMENTS

| | | |
|---|---|---|
| JP | 09325928 A * | 12/1997 |
| JP | A-9-325928 | 12/1997 |
| JP | A 10-83263 | 3/1998 |
| JP | A-2000-105677 | 4/2000 |
| JP | A-2000-105678 | 4/2000 |
| JP | A-2000-137592 | 5/2000 |
| JP | A-2002-73576 | 3/2002 |
| JP | A-2002-108632 | 4/2002 |

* cited by examiner

FIG. 5

| |
|---|
| SERVICE CLASS |
| SERVICE NAME |
| SERVICE ICON |
| SERVICE INFORMATION LOCATION |
| INPUT |
| OUTPUT |
| PARAMETER RESTRICTION RULES |
| SERVICE LOCATION |
| METHOD NAME |
| INVOCATION SCHEME |
| IMPLICIT ELEMENTS |
| FLOW<br>(INVOCATION, MAP, METHOD)<br>(CONTROL STRUCTURE, LOGICAL OPERATION) |

SERVICE PROCESSING DEVICE AND METHOD

BACKGROUND OF THE INVENTION

1. Field of Invention

The present invention relates to a service processing device and method, and particularly to a service processing device and method suitable for use in a workflow system in which a paper document is digitized to construct workflow.

2. Description of Related Art

It is known to provide a compound machine in which facsimile, scanner and printer functions are integrated in one machine, which also can function as a copy machine. With such a machine, it is possible to link paperwork mainly using paper and employing a copying machine, a facsimile machine or the like with processing of documents digitized on a personal computer.

For example, a paper document can be scanned and then can be transferred to a personal computer, or a document received through a facsimile machine can be directly transmitted as image data to a personal computer, rather than being printed. Further, after the paper document or the facsimile reception document is digitized, it is desired that many proceedings and processings be linked with each other and automated.

Thus, a technique is conventionally proposed in which a job template describing desired settings concerning items to be set in a compound machine is prepared in advance, the job template is specified, set values are changed as the need arises, and a set processing is performed.

For example, a conventional image forming apparatus (for example, a printer, a facsimile machine, a copier, all of which can print images on paper) stores the plural output setting data (job template) for setting output forms, and can form and output an image in the output form in accordance with the selected output setting data (see, for example, JP-A-10-83263 (pages 5 to 7, FIGS. 2 and 5)).

However, for example, in the image forming apparatus disclosed in JP-A-10-83263, the only object that can be set is "output form", that is, only the output form (output settings) of the image forming apparatus itself can be set. Accordingly, since the above image forming apparatus does not perform the setting of another printer or scanner connected to a network, or perform the setting of linking processings by other equipment, there has been a problem that plural processings can not be linked with each other.

SUMMARY OF THE INVENTION

The present invention has been made to address the above problems, and provides a service processing device and method which can link different pieces of equipment connected to a network with each other to perform plural processings to be performed to document data.

In order to address the above problems, according to an aspect of the invention, a service processing device includes an interpretation unit that interprets contents of script data that describes at least a location of document data as a processing object and contents of plural service processing operations to be performed to the document data, and a linkage processing unit that links plural service processing units that are connected to a network with each other to perform the plural service processing operations to the document data on the basis of an interpretation result of the interpretation unit.

According to another aspect of the invention, a service processing method includes the steps of: (1) interpreting contents of script data that describes at least a location of document data as a processing object and contents of plural service processing operations to be performed to the document data; and (2) linking plural service processing units that are connected to a network with each other to perform the plural service processing operations to the document data on the basis of an interpretation result at the interpreting step.

According to another aspect of the invention, a service processing device includes an interpretation unit that interprets contents of script data that describes at least a location of document data as a processing object and contents of plural service processing operations to be performed to the document data, a processing execution unit that executes at least one of the service processing operations to the document data on the basis of an interpretation result of the interpretation unit, and a transmission unit that transmits the script to another service processing device to perform a next service processing operation after the processing execution unit executes the at least one service processing operation.

According to another aspect of the invention, a service processing method includes the steps of: (1) interpreting contents of script data that describes at least a location of document data as a processing object and contents of plural service processing operations to be performed to the document data; (2) executing at least one of the service processing operations to the document data on the basis of an interpretation result at the interpretation step; and (3) transmitting, after execution of the at least one service processing operation is ended, the script to another service processing device for performing a next service processing operation.

BRIEF DESCRIPTION OF THE DRAWINGS

Preferred exemplary embodiments of the present invention will be described in detail based on the following figures, in which:

FIG. 5 is a view showing the configuration of a script created by a script creation part;

DETAILED DESCRIPTION OF PREFERRED EMBODIMENTS

Hereinafter, preferred embodiments of the present invention will be described in detail with reference to the drawings.

Figure 1:
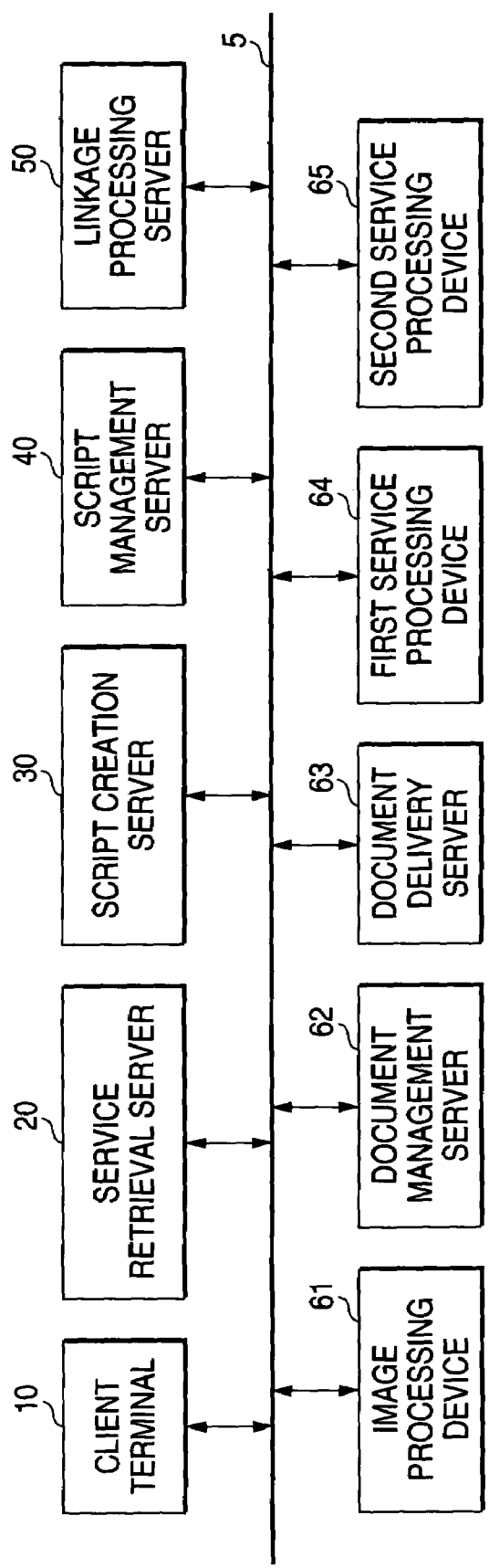
FIG. 1 is a block diagram showing the configuration of a document processing system according to a first embodiment of the invention.

FIG. 1 is a block diagram showing the configuration of a document processing system 1 according to a first embodiment of the invention.

The document processing system 1 includes devices and applications for performing various services connected to each other through a network 5. A service is a function usable on a document in accordance with a request from the outside. Some examples of services are, for example: copy, print, scan, facsimile transmission and reception, mail delivery, storing into repository and readout from repository, OCR (Optical Character Recognition) processing, noise removal processing, and the like. The invention is not limited to these particular services.

The document processing system 1 includes a client terminal 10 provided with a user interface for linking plural services with each other to indicate a desired processing of a user, a service retrieval server 20 for retrieving the desired service(s) of the user, a script creation server 30 for creating a script from information relating to the service linkage indicated by the client terminal 10, a script management server 40 for managing the script, and a linkage processing server 50 for executing a linkage processing of the respective services in accordance with the script.

Further, the document processing system 1 includes an image processing device 61 for performing image processing such as, for example, a noise removal processing of an image document, an image rotation processing, an OCR processing, and binding of images, a document management server 62 for managing documents, a document delivery server 63 for delivering documents, a first service processing device 64 for performing a first service processing, and a second service processing device 65 for performing a second service processing.

According to the embodiment, although the document processing system 1 has the configuration in which the plural servers for performing specific service processings are connected through the network 5, as long as the plural services are connected through the network 5, the configuration is not particularly limited. For example, the functions performed by two or more of the above-described services and devices can be performed by a single piece of equipment and/or processor.

In the present example, the script is data containing, in a case where a series of processings are decomposed into plural functional processings: information expressing a relation among the respective functions, interface (I/F) information for invoking the respective functions, and information for configuring a graphical user interface (GUI) relating to the series of processings.

Figure 2:
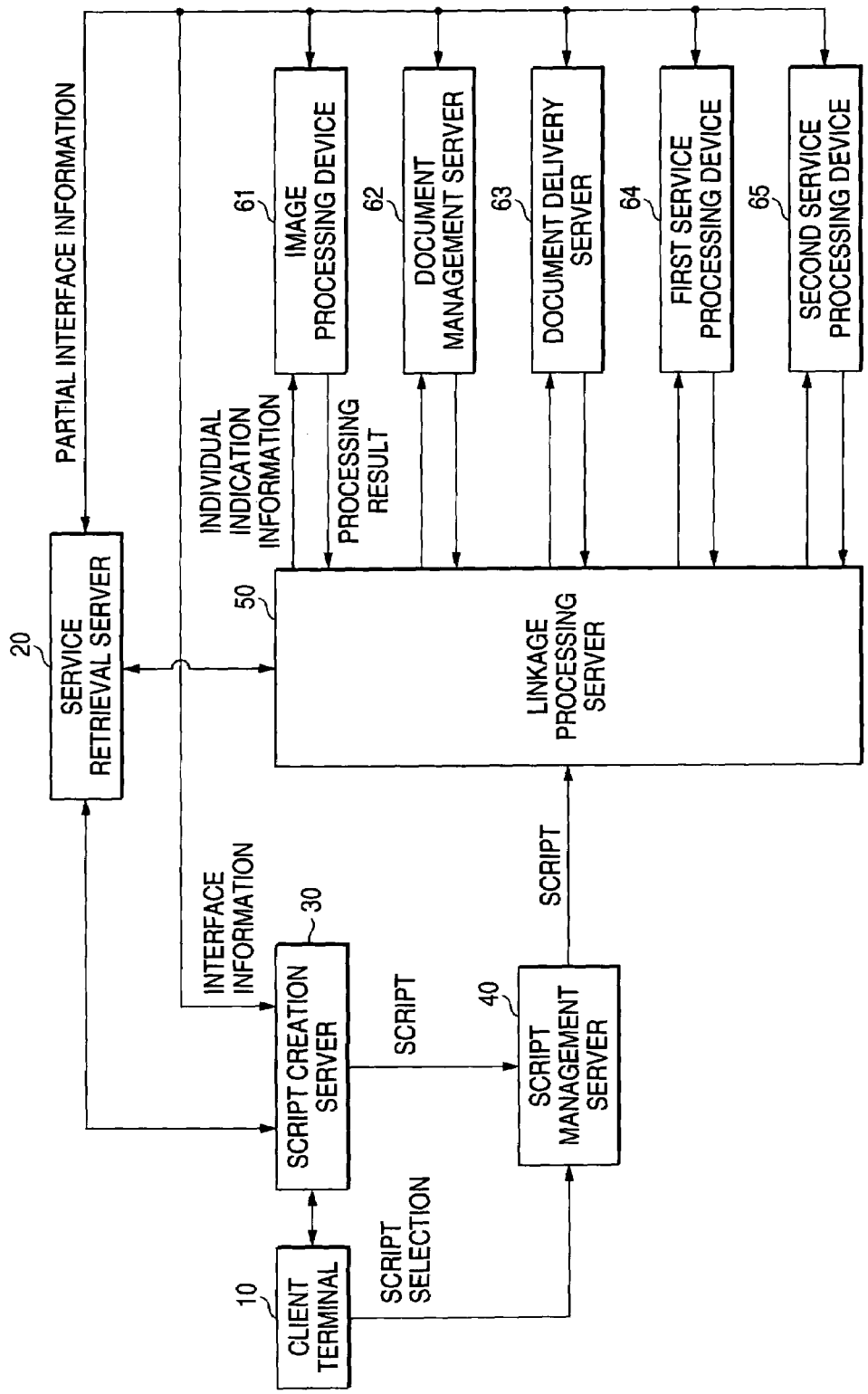
FIG. 2 is a block diagram for explaining the flow of information among respective parts of the document processing system.

FIG. 2 is a block diagram for explaining the mutual relation of the respective service processing devices configuring the document processing system 1. Each of the service processing devices stores VF information expressing the contents of the service provided by itself.

Figure 3:
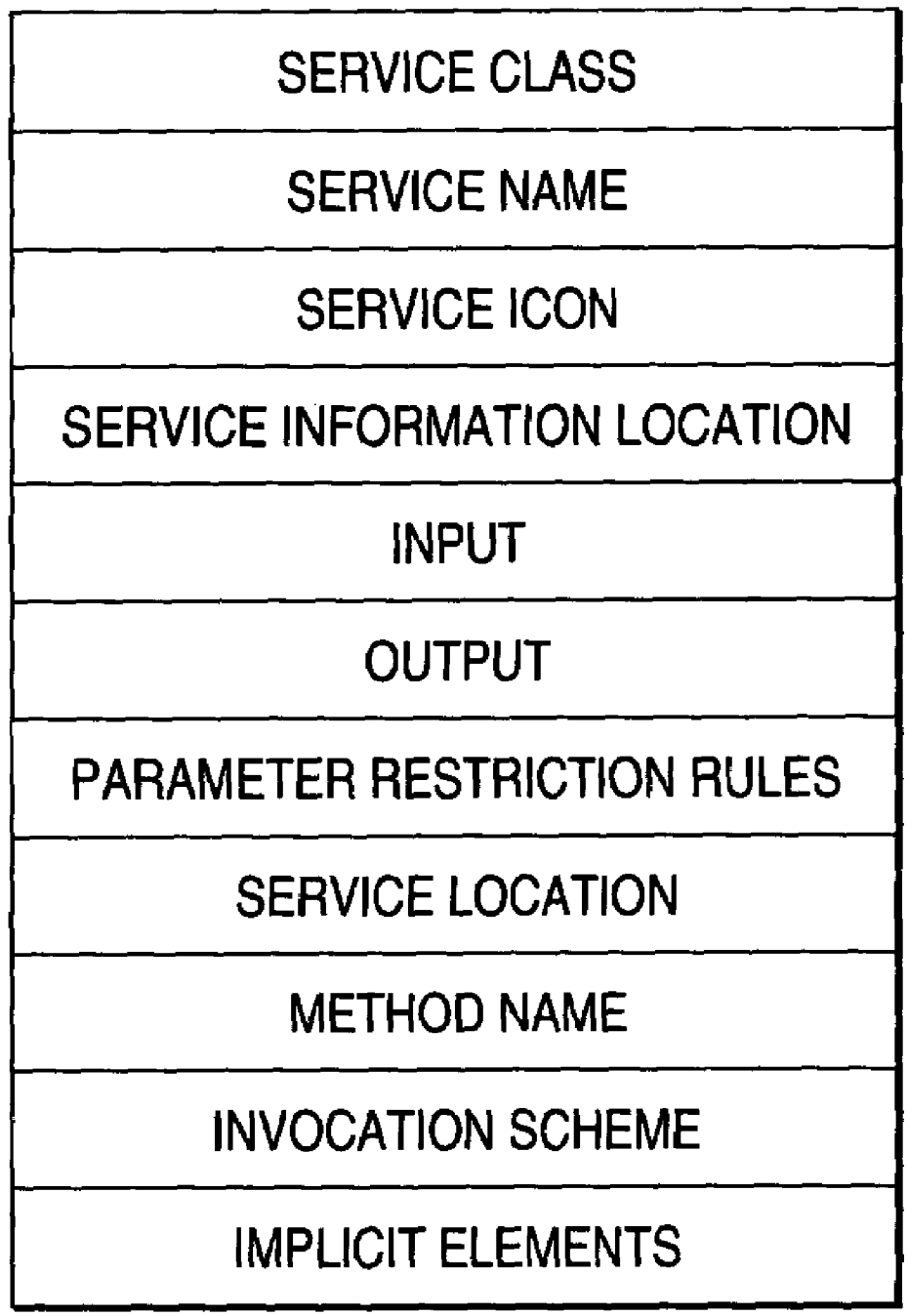
FIG. 3 is a view showing the configuration of I/F information stored in respective devices.

FIG. 3 is a view showing the configuration of the I/F information. The I/F information is constituted by <Service Class>, <Service Name>, <Service Icon>, <Service Information Location>, <Input>, <Output>, <Parameter Restriction Rules>, <Service Location>, <Method Name>, <Invocation Scheme>, and <Implicit Elements>.

The <Service Class> is a class (processing content) of the service provided by the service processing device. Specific examples of a <Service Class> include, for example: scan, print, repository, flow and the like. The <Service Name> is a name of the service provided by the service processing device. The <Service Icon> is position information of an icon displayed on the GUI of the client terminal 10.

The <Service Information Location> is a URL which the script creation server 30 uses for acquisition of the I/F information. The <Input> is an input to the service. The <Output> is an output from the service. The <Parameter Restriction Rules> are restriction rules applied to the <Input>. The <Service Location> is position information when the service is actually used. In the <Method Name>, a provision method of a service processing and a name expressing the service are described.

The <Invocation Scheme> is a scheme for invoking and starting the service processing. Some examples of the <Invocation Scheme> are, for example: SOAP (Simple Object Access Protocol) as the protocol of message exchange, SMTP (Simple Mail Transfer Protocol), and the like. The <Implicit Elements> are not data which are explicitly delivered as output to a latter stage processing, however, they are data which can be consulted at a latter stage processing.

The client terminal 10 performs the function of a graphical user interface (GUI) for performing a specific operation, for example, for indicating the creation of a script or for performing a screen display in order to select the script to be invoked.

The service retrieval server 20 retrieves a service corresponding to a retrieval condition from plural services connected to the network 5. The service retrieval server 20 previously stores part of the I/F information (hereinafter referred to as "partial I/F information") of various service processing devices, such as the image processing device 61, the document management server 62, the document delivery server 63, the first service processing device 64, and the second service processing device 65. The partial I/F information can include, for example, the information of <Service Class>, <Service Name>, <Service Information Location>, <Input>, and <Output> in the elements of the I/F information.

When the retrieval condition is transmitted from the script creation server 30 or from the linkage processing server 50, the service retrieval server 20 uses the partial I/F information of the respective service processing devices to retrieve the service. For example, when a service similar to a specific service is retrieved, the service retrieval server 20 may retrieve services which are coincident to each other in the <Service Class>, or may retrieve services which are coincident to each other in the <Input> and <Output>, or may retrieve services which are coincident to each other in all of these.

At the time of creation of the script, the script creation server 30 acquires the I/F information from the respective service processing devices, and creates the script for linking the services provided by the respective service processing devices with each other. The script creation server 30 specifically executes the following processing to create the script.

The script creation server 30 requests a specific service processing device dispersed on the network 5 to transmit the I/F information relating to the respective services on the basis of the <Service Information Location>. In the case where the specific service processing device does not exist, the script creation server 30 instructs the service retrieval server 20 to retrieve another service processing device that is capable of performing the same service as the specific service processing device. Then, the script creation server 30 has only to acquire the <Service Information Location> of the another service processing device from the service retrieval server 20.

The script creation server 30 manages the retrieval result from the service retrieval server 20 and the I/F information received from the respective service processing devices. The script creation server 30 creates an HTML file which becomes a GUI screen for defining a job flow (linkage processing) on the basis of the I/F information acquired from the respective service processing devices. When receiving a browse request for services from the client terminal 10, the script creation server 30 transmits the HTML file which becomes the GUI screen to the client terminal 10.

Figure 4:
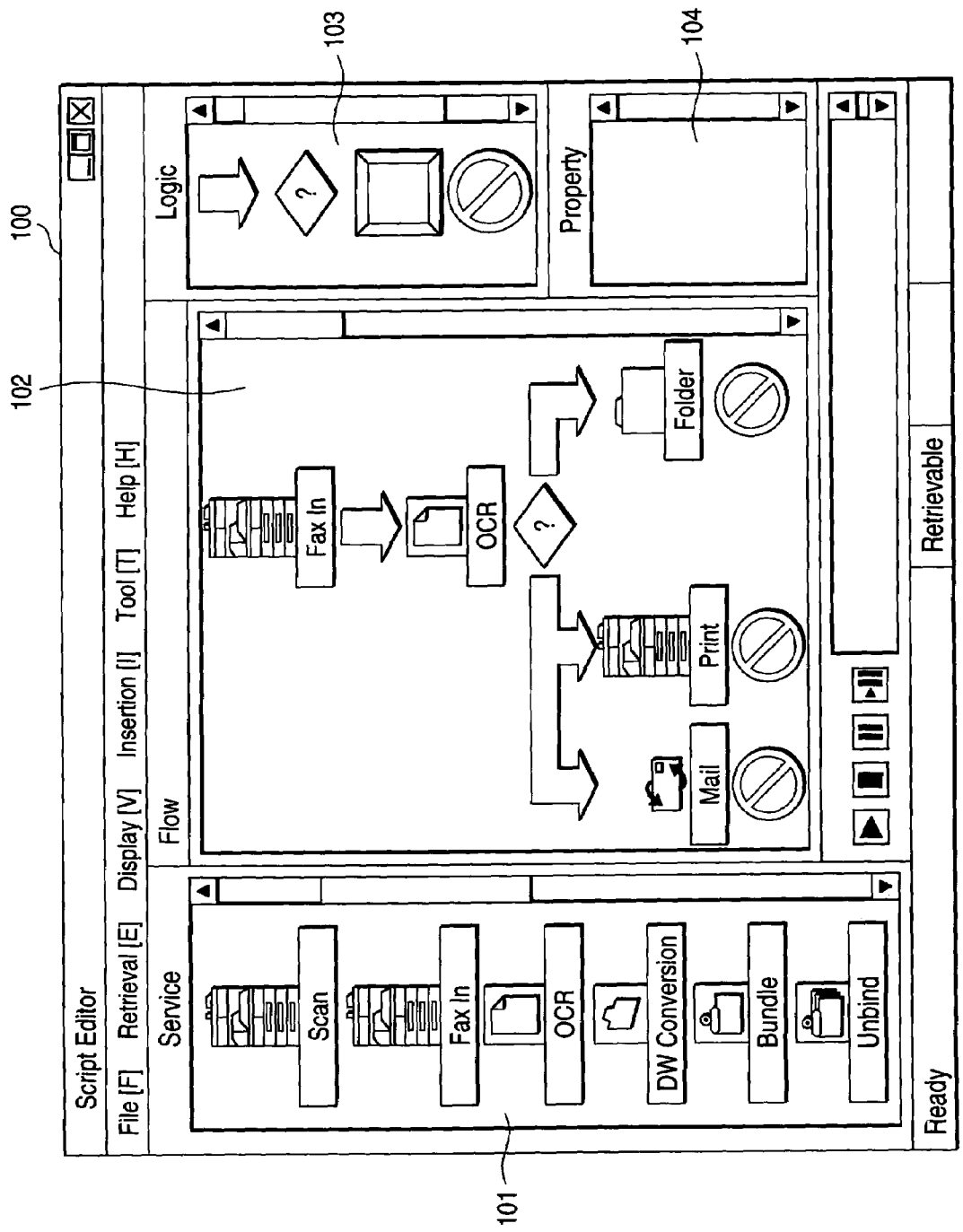
FIG. 4 is a view showing a script editor screen displayed on the GUI of a script editor.

FIG. 4 is a view showing a script creation screen 100 as the GUI screen for defining the job flow. The script creation screen 100 is constituted by a service window 101, a flow window 102, a logic window 103, and a property window 104.

The service window 101 displays various usable service processing devices and/or services. The logic window 103 displays the job flow showing linkage patterns among the services. The property window 104 displays detailed setting parameters of respective icons displayed on the service window 101 and the logic window 103.

The user can define the job flow on the flow window 102 by dragging and dropping icons of the service window 101 and icons of the logic window 103 to the flow window 102. The user further edits the contents displayed on the property window 104 and can fully set the relation between services by using the available logics.

As stated above, the user defines the job flow by dragging and dropping icon(s) of the service window 101 and icon(s) of the logic window 103 to the flow window 102, and edits the contents displayed on the property window 104, so that the user can easily create the script for linking various and complicated processings with each other.

The client terminal 10 transmits the job flow information defined by the operation of the user to the script creation server 30 in accordance with a CGI (Common Gateway Interface) format.

The script creation server 30 creates the script defining the contents of the processing requested of the respective services, input parameters, the way (job flow) of linkage of the respective services, and information for specifying a document as a processing object, such as a document name and storage location information, on the basis of the job flow information relating to the indication of the service linkage from the user and the I/F information of the respective services. The script is constituted by files of an XML format, for example.

FIG. 5 is a conceptual view showing the script composed in the XML format. Since the linkage processing itself of the plural services is also regarded as one service, the script has the configuration in which <Flow> is added to the I/F information shown in FIG. 3.

The <Flow> is an element for describing the linkage between services and includes <Invoke>, control structure and logic operation, elements such as <if> for performing a conditional judgment, the operation indication of the XML structure for adjusting the linkage between the services, and information for specifying a document as a processing object.

The <Invoke> expresses a specific method of a service processing device, and executes invocation of a service. Elements of <Invoke> include <Map> expressing the position information of a parameter, and <Method> expressing a method name to be invoked. The <if>, <and>, <eq> and <gt> express the control structure, the logic operation and the like, carries out condition branching at the time of the linkage processing and the adjustment of parameters delivered between the services.

The script describes all information relating to the control of the linkage processing of the services in the element of the <flow>. By this process, the linkage processing itself expressed by the script is also regarded as one service. The script is not limited to the configuration shown in FIG. 5, and it is sufficient as long as the respective services can be linked with each other.

The script creation server 30 transmits the script of the XML format as described above to the script management server 40. In the case where immediate execution of the service linkage processing is indicated by the user, the script creation server 30 may directly transmit the script to the linkage processing server 50.

The script management server 40 holds the script transmitted from the script creation server 30, and transmits the script to the linkage processing server 50 in accordance with a request from the client terminal 10. As stated above, when the created script is stored and held, the script can be invoked and executed as the need arises, so that it is not necessary to create the script each time a user desires it to be executed, and therefore documents can be efficiently processed.

The linkage processing server 50 is a server for interpreting and executing the specified script. When the script is transmitted, the linkage processing server 50 interprets the script, sequentially invokes the respective service processing devices, such as the image processing device 61, the document management server 62, and the document delivery server 63 in accordance with the order and the use method described in the script, and executes linkage processing. The linkage processing server 50 also stores the state of the linkage processing that is being executed, and the information of the result of the completed linkage processing, and notifies the state of the linkage processing and the result in accordance with a request from the outside.

The linkage processing server 50 interprets the script, and when making a request to the respective service processing devices, the linkage processing server 50 creates individual indication information having the contents of the processing request, input parameters and information for specifying the document as the processing object. The linkage processing server 50 may describe the relation to a processing before or after a processing is performed by the respective service processing devices in the script, or the processing request may be made in an information exchange form intrinsic to each service processing device, not the form of the script.

The image processing device 61 is a computer in which a software program for performing an image processing function is installed. The image processing device 61 performs the processing of the document on the basis of the contents of the service processing request contained in the processing request from the linkage processing server 50, the input parameter, and the information of the document that is the processing object. The image processing device 61 also notifies the service retrieval server 20 of the partial I/F information at the time of invocation. Further, in accordance with the request from the script creation server 30, the image processing device 61 transmits the I/F information expressing the use method of the image processing service. The I/F information is used when the script is created.

The document management server 62 has a document storage function. The document management server 62 carries out the storage, retrieval, and readout of the document, the change of attribute relating to the document, and various processings on the basis of the information contained in the request from the linkage processing server 50. The document management server 62 also notifies the service retrieval server 20 of the partial I/F information at the time of invocation. Further, the document management server 62 transmits the I/F information expressing the use method of the document management service in accordance with the request from the script creation server 30.

The document delivery server 63 functions to store the acquired document into the indicated document management server, to perform mail transmission or FAX transmission to an indicated transmission destination, and to perform a print output processing to an indicated printer. In accordance with the request from the linkage processing server 50, the document delivery server 63 performs the delivery processing of the document on the basis of the document indicated by the client terminal 10 and the information of the delivery destination. The document delivery server 63 also notifies the service retrieval server 20 of the partial I/F information at the time of invocation. Further, the document delivery server 63 transmits the I/F information expressing the use method of the document delivery processing service in accordance with the request from the script creation server 30.

The first service processing device 64 is a device for performing a specific service processing relating to the document in accordance with the indication from the outside. Here, the first service processing device 64 carries out the service processing to be executed by itself on the basis of the contents of the processing request from the linkage processing server 50, the input parameter, and the information for specifying the document as the processing object. The first service processing device 64 notifies the service retrieval server 20 of the partial I/F information at the time of invocation. Further, the first service processing device 64 transmits the I/F information expressing the use method of the service processing that it performs in accordance with the request from the script creation server 30. The second service processing device 65 operates similar to the first service processing device 64 except for the contents of the service processing.

In the document processing system 1 configured as described above, when application programs for executing specific services are installed in the respective service processing devices such as the image processing device 61, the document management server 62, and the document delivery server 63, they operate as follows.

The service processing devices such as the image processing device 61, the document management server 62, and the document delivery server 63 notify the service retrieval server 20 of the partial I/F information containing the information expressing the respective service summaries and addresses at the invocation processing.

The service retrieval server 20 stores the partial I/F information transmitted from the respective service processing devices such as the image processing device 61, the document management server 62 and the document delivery server 63. Accordingly, when a specific service retrieval request is issued from, for example, the script creation server 30 or the linkage processing server 50, the service retrieval server 20 can perform retrieval by using the partial I/F information.

The linkage processing server 50 functions as an interpretation unit and as a linkage processing unit. The client terminal 10 functions as a setting unit and as a selection unit. The script creation server 30 functions as a creation unit. The script management server 40 functions as a storage unit.

Figure 6:
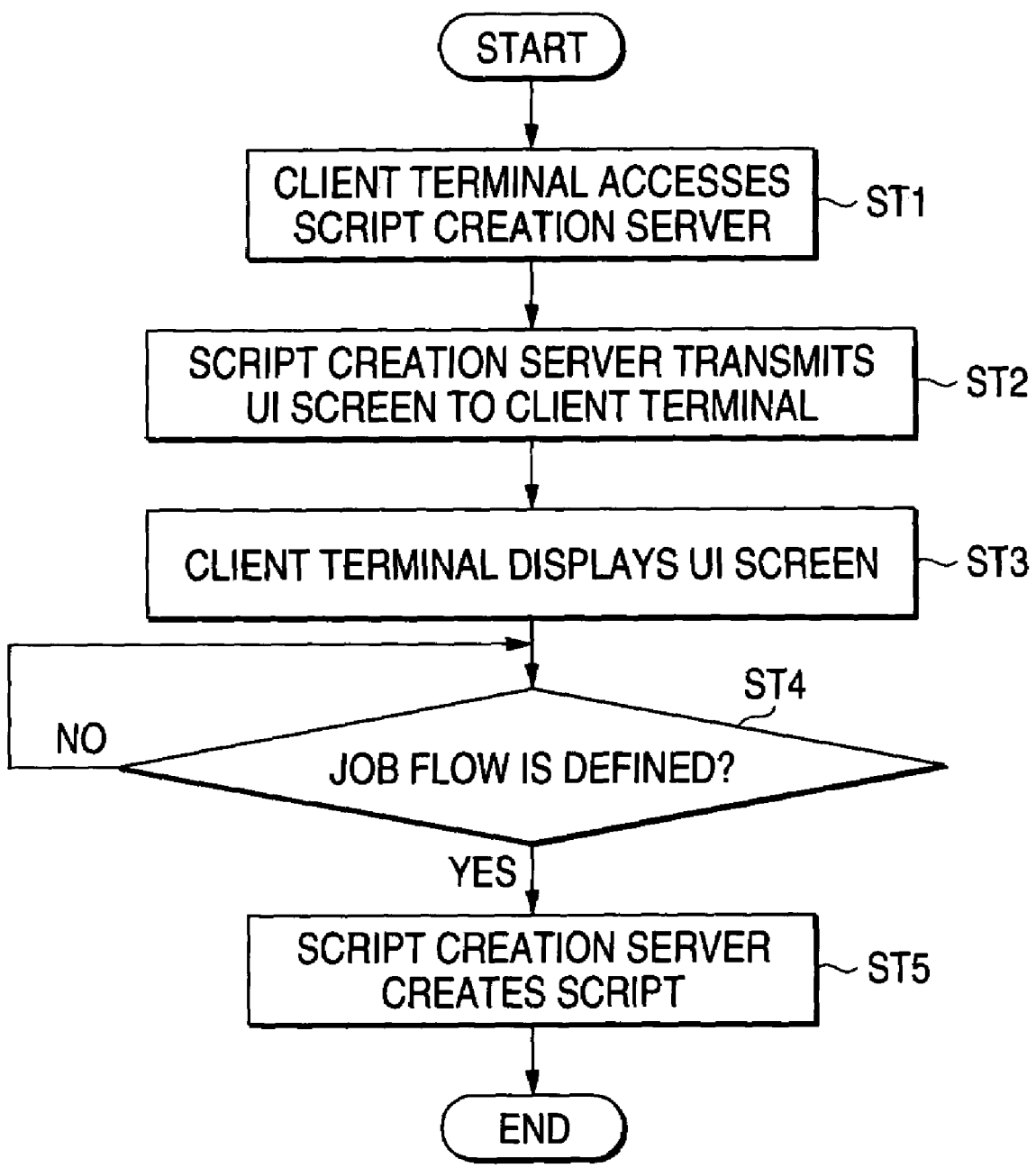
FIG. 6 is a flowchart showing the procedure of a script creation processing.

FIG. 6 is a flowchart showing a processing procedure of the client terminal 10 and the script creation server 30 at the time of creating the script.

The client terminal 10 accesses a URL (Uniform Resource Locator) of an HTML file created for the user interface screen provided by the script creation server 30 through an installed browser in accordance with the operation of the user (step ST1).

The script creation server 30 transmits the HTML file of the user interface screen to the client terminal 10 in accordance with the browse request from the client terminal 10 (step ST2).

The client terminal 10 displays the user interface screen on the basis of the information for constructing the screen and contained in the HTML file transmitted from the script creation server 30 (step ST3). At this time, the user can define a desired service linkage job flow by using the user interface screen displayed on the client terminal 10.

The client terminal 10 judges whether or not the job flow is defined (created), through the user interface screen, and stands by until the job flow is defined (step ST4). When it is judged that the job flow is created, the client terminal 10 transmits the job flow information relating to the service linkage, as defined by the user, to the script creation server 30.

The script creation server 30 creates the script defining the contents of the processing requested to the respective services, input parameters, the way of linkage of the respective services, information for specifying a document as a processing object, such as a document name or storage location information, on the basis of the information relating to the job flow of the service linkage transmitted from the client terminal 10 and the I/F information acquired from the respective service processing devices (step ST5). Then, the script creation server 30 transmits the script of the XML format to the script management server 40.

The script management server 40 stores the script created by the script creation server 30. The script management server 40 stores plural scripts created by the script creation server 30, and when the selection indication of the script is issued from the client terminal 10, the selected script is read out.

The user selects a desired script among the plural scripts stored in the script management server 40, and can invoke the linkage processing. A specific example is described below.

Figure 7:
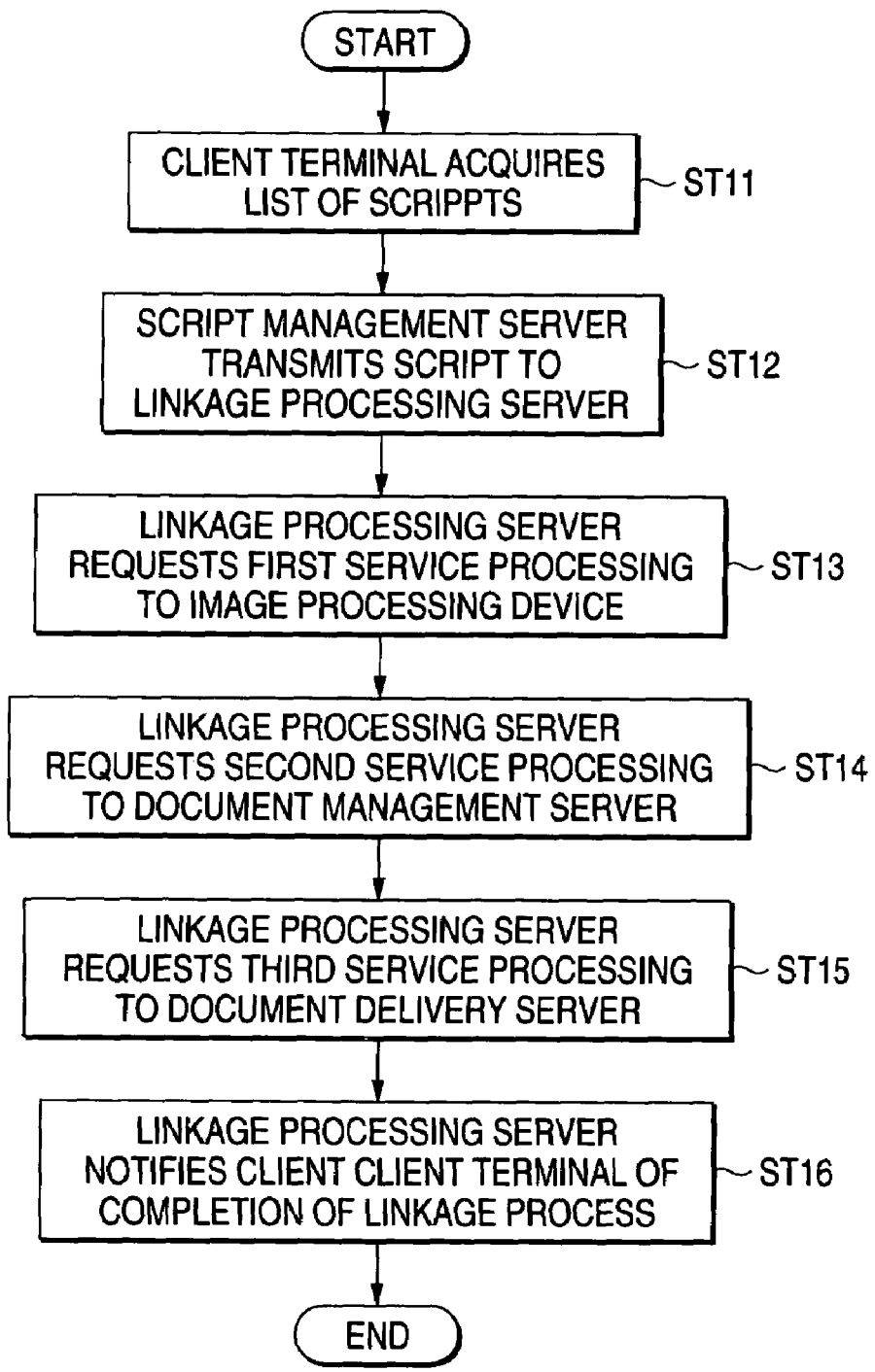
FIG. 7 is a flowchart showing the procedure of a linkage processing of a document processing system.

FIG. 7 is a flowchart showing the processing of the client terminal 10, the script management server 40 and the linkage processing server 50. Here, a description will be given of a case where an image processing such as noise removal and OCR processing is performed to a specific document, and a processing to bind an extracted text document and image document is performed, the bound document is stored into a specific storage destination, only the text document in the bound document is mailed to a mail address specified as a delivery destination, and only the image document is faxed to a specified FAX number.

The client terminal 10 accesses the script management server 40 and acquires the script list managed by the script management server 40 (step ST11).

Figure 8:
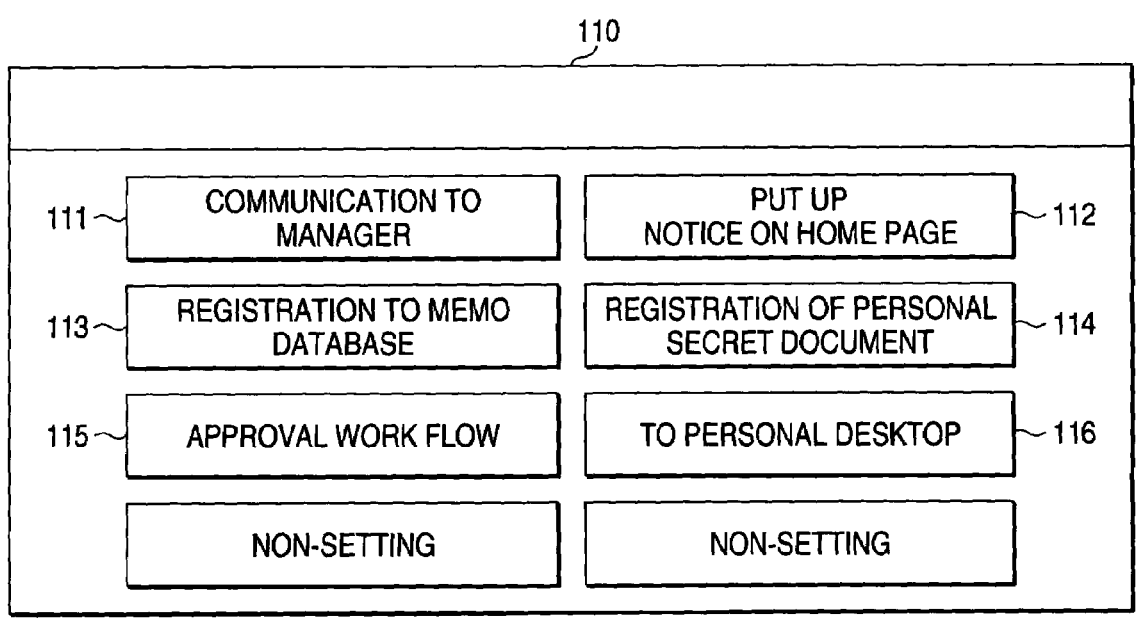
FIG. 8 is a view showing an example of a script list screen indicating the list of scripts.

FIG. 8 is a view showing an example of a service linkage processing selection screen 110 expressing the script list. The service linkage processing selection screen 110 has buttons 111 to 116 for selecting scripts. The user can select the script by clicking a desired button from the service linkage processing selection screen 110.

The client terminal 10 selects the script expressing the specific service linkage processing from the service linkage processing selection screen 110 on the basis of the operation indication of the user, and indicates the invocation of the script. At this time, as the need arises, the parameter input screen is displayed to urge the user to input parameters (if any) necessary for execution of the job.

The script management server 40 transmits the script indicated by the client terminal 10 to the linkage processing server 50 (step ST12). As a result, the linkage processing server 50 starts the execution of the linkage processing.

The linkage processing server 50 interprets the script transmitted from the script management server 40, and requests the image processing device 61 as the first processing described in the script to execute the first service processing (step ST13). Specifically, the linkage processing server 50 extracts the location of the service processing device to which the processing request is made, the input parameter and output parameter form necessary for the processing request, the method name for the processing request, invocation scheme, and the information for specifying the processing object document on the basis of the information described in the script, and creates individual indication information. The linkage processing server 50 transmits the individual indication information to the image processing device 61 as the first processing request destination.

The image processing device 61 copies the processing object document and acquires the document on the basis of the location information of the storage destination of the processing object document described in the transmitted script. The image processing device 61 interprets the contents of the service processing request with respect to the acquired document image, performs the image processing such as noise removal and OCR processing, and performs a processing to bind it to the extracted text document. The image processing device 61 again stores into the original storage destination, the document in which the image document obtained by the image processing and the text document are bound. When the processing as stated above is completed, the image processing device 61 transmits the processing result, such as the status information (completion) of the processing, the output parameters, and the document storage destination information after the processing, to the linkage processing server 50.

When receiving the processing result from the image processing device 61, the linkage processing server 50 manages the result of the first processing request as a log. Then, the linkage processing server 50 specifies a second processing request destination on the basis of the script, and requests the document management server 62 to perform a second service processing (step ST14). Similar to the first service processing request, the linkage processing server 50 transmits individual indication information (information to store a document as information relating to a processing request, information of a storage destination of the document, and information to specify a processing object document) to the document management server 62.

On the basis of the contents of the request of the linkage processing server 50, the document management server 62 performs, on the basis of the storage destination information described in the request content, a storage processing of the document processed and stored in the previous processing (first service processing). When the processing as stated above is completed, the document management server 62 transmits the processing result, such as the status information (completion) of the processing, the output parameter, and document storage destination information after the processing, to the linkage processing server 50.

When receiving the processing result of the second service processing (document storage processing), the linkage processing server 50 manages the result of the second processing request as a log. The linkage processing server 50 specifies a third processing request destination on the basis of the script, and requests the document delivery server 63 to carry out a third service processing (step ST15). Similar to the second service processing request, the linkage processing server 50 transmits individual indication information (information to store a document as information relating to the processing request, information of a storage destination of the document, and information to specify the processing object document) to the document delivery server 63.

On the basis of the contents of the request of the linkage processing server 50, with respect to the document processed and stored in the previous processing (second service processing), the document delivery server 63 reads out the document file on the basis of the information (storage destination information) to specify the document, and performs the processing described in the contents of the request. Here, the document delivery server 63 mails only a text document to a mail address specified as a delivery destination in the document in which the text document and the image document are bound, and faxes only the image document to a FAX number. When the processing is completed, the document delivery server 63 transmits the processing result, such as the status information (completion) of the processing, the output parameter, and document storage destination information after the processing, to the linkage processing server 50.

In this processing, for example, in the case where during the FAX transmission processing, the opposite party was engaged on the phone (i.e., the line was busy), and even if a retry was performed a predetermined number of times, the connection with the opposite party could not be established, the document delivery server 63 transmits the status information "mail transmission: completed, FAX transmission: non-transmission" to the linkage processing server 50.

The linkage processing server 50 receives the processing result from the third service processing, and when judging that a next processing is not described in the script, the linkage processing server 50 notifies the client terminal 10 that all processings are completed, and ends the linkage processing (step ST16).

As stated above, in accordance with the script in which the information relating to the indication of the linkage of plural service processings to be performed to the document, and the information relating to the storage position of the document are described, the service processings to be carried out in the processing parts respectively connected to the network are linked with each other, various and complicated processings can be efficiently performed.

The respective parts, such as the server connected to the network 5, may be respectively constructed as independent devices, some parts can be combined to be provided in one apparatus, or all parts may be provided in one apparatus.

Figure 10:
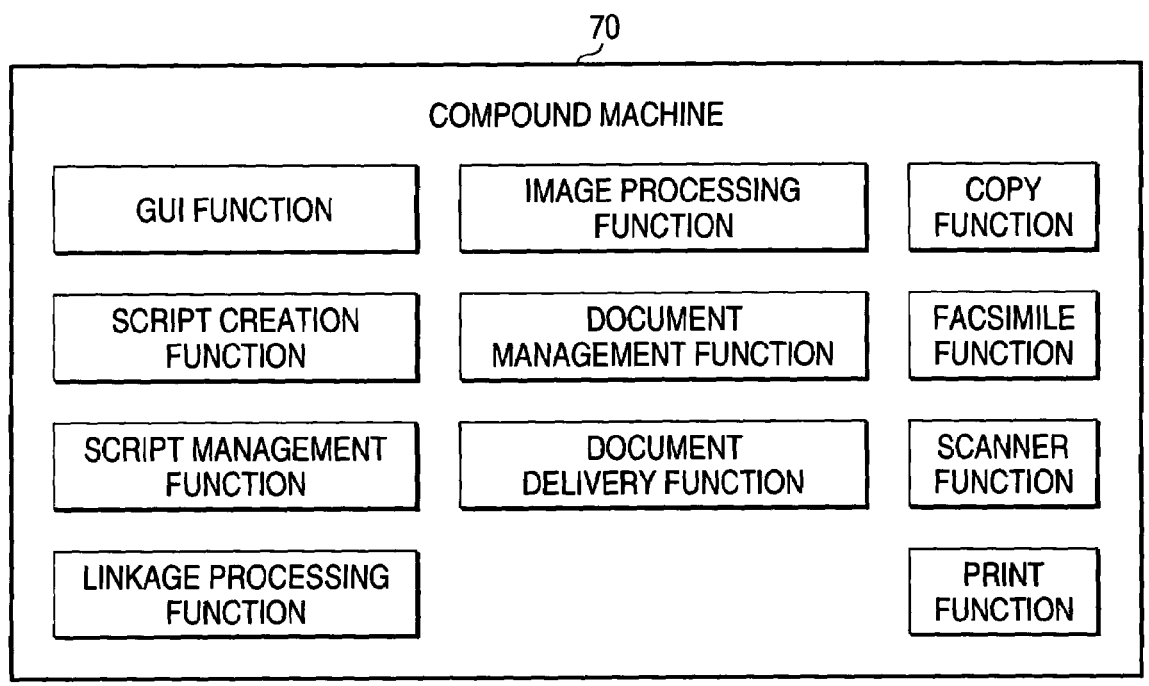
FIG. 10 is a function block diagram of a compound machine.

For example, as shown in FIG. 10, the GUI function of the client terminal 10 for performing various operations such as script creation and script selection, the script creation function of the script creation server 30, the script management function of the script management server 40, the linkage processing function of the linkage processing server 50, the image processing function of the image processing device 61, the document management function of the document management server 62, and the document delivery function of the document delivery server 63 may be provided in a compound machine 70 including various functions as functions to perform service processings, such as the copy function, FAX function, scanner function, and print function.

In this case, in the compound machine 70, the creation and storage of the script can be performed, and with respect to document data stored in the compound machine 70, the image processing such as noise removal processing and OCR processing, the storage processing of document data after the processing, FAX transmission, mail transmission and the like can be performed in linkage with each other. Of course, similar to the above embodiment, it also is possible for the client terminal 10 to perform creation of the script and selection.

The document data as the processing object and the script may be stored in another external device connected to the network 5. The document data stored in the compound machine 70 or the document data stored in the another external device need not be processed by the compound machine 70, but may be processed by another compound machine connected to the network or external devices respectively connected to the network and having various processing functions.

In this embodiment, although the service retrieval server 20 acquires part (partial I/F information) of the I/F information from the respective service processing devices, all of the I/F information may be acquired.

Next, a second embodiment of the invention will be described. The same parts as those of the first embodiment are denoted by the same reference numerals and their detailed description will be omitted.

Figure 9:
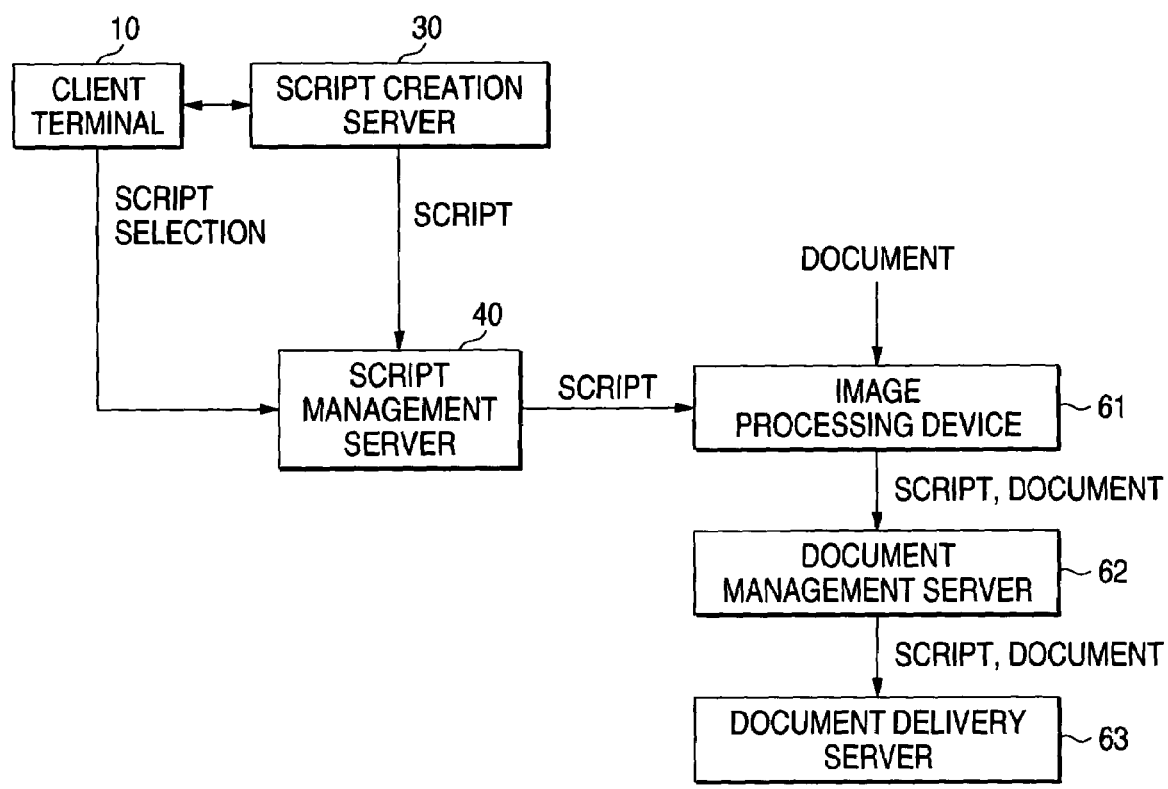
FIG. 9 is a block diagram for explaining the flow of information among respective parts of a document processing system according to a second embodiment of the invention.

FIG. 9 is a block diagram for explaining the mutual relation among respective service processing devices constituting a document processing system 80 according to the second embodiment. The document processing system 80 according to the second embodiment can carry out the linkage processing of plural services without using the linkage processing server 50 shown in FIGS. 1 and 2.

Although the document processing system 80 includes the service processing devices (except for the linkage processing server 50) shown in FIG. 1, FIG. 9 shows only the service processing devices relating to the linkage processing.

A user selects a desired script among plural scripts stored in a script management server 40 and can invoke the linkage processing. Specifically, this is as follows.

A client terminal 10 selects a script expressing a desired service linkage processing from a service linkage processing selection screen in accordance with the operation of the user, and indicates the invocation of the script. The script management server 40 transmits the script indicated by the client terminal 10 to an image processing device 61.

The image processing device 61 acquires a document as a processing object on the basis of storage destination location information of the processing object document described in the transmitted script. The image processing device 61 interprets the contents of a service processing request with respect to the acquired document image, performs the image processing such as noise removal and OCR processing, and performs a processing to bind it to the extracted text document. After the specific image processing is ended, the image processing device 61 deletes the service processing request described in the script. Then, the image processing device 61 transmits the document in which the image document obtained by the image processing and the text document are bound, and the script including the processing result such as the status information (completion) of the processing, the output parameter, and document storage destination information after the processing, to a document management server 62 for providing a next service processing.

After the specific image processing is ended, the image processing device 61 corrects or deletes a portion relating to its own service request described in the script, and may transmit it to the document management server 62. Further, the image processing device 61 may transmit the script to a next service processing device after the specific image processing is ended.

The document management server 62 temporarily stores the document transmitted from the image processing device 61 into a storage destination described in the script. Then, the document management server 62 deletes the service processing request described in the script, and transmits the document and the script to a document delivery server 63 to perform a next service processing.

On the basis of the script, the document delivery server 63 mails only the text document to a mail address specified as a delivery destination in the document in which the text document and the image document are bound, and faxes only the image document to a specified FAX number. Then, when judging that a next processing is not described in the script, the document delivery server 63 notifies the client terminal 10 that all processings are completed, and ends the linkage processing.

Also in this embodiment, similar to the first embodiment, the respective parts, such as the servers, connected to the network 5 may be respectively configured as independent devices, some parts may be combined to be provided in one apparatus, or all parts may be provided in one apparatus.

The present invention has an effect that it is possible to link plural equipments connected to the network with each other to perform plural processings to be performed to the document data.

As noted above, the various servers and devices (10, 20, 30, 40, 50 and 61-65) can be individual units or can be combined into one or more than one unit. Each of these servers and devices includes a controller that causes (controls) it to perform the functions described above. Of course if the servers and devices are combined into one or more than one unit, then there would be one or more than one controller to perform the functions described above. Thus, the invention can be implemented by one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller(s) can be implemented using a suitably programmed general purpose computer(s), e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. a service processing device comprising:
   a controller that:

(1) interprets contents of script data that describes a location of document data object to be processed, contents of plural service processing operations to be performed to the document-data, and process flow of the plural service processing operations; and (2) links plural service processing apparatus that are connected to a network with each other to perform the plural service processing operations to the document data on the basis of a result of the interpreted contents, wherein at least two of the service processing apparatus each perform a different subset of the service processing operations, and wherein the plural service processing operations includes a first service processing operation to be performed to the document data by first service processing apparatus and a second service processing operation to be performed to the document data by second service processing apparatus, the first and second service processing operations being different types of operations, the document data being processed by the first service processing operation to produce first modified document data, the first modified document data being processed by the second service processing operation to produce second modified document data;

transmits, according to the process flow, information specifying the location of the document data to the first service processing apparatus to perform the first service processing operation to the document data;

receives, from the first service processing apparatus, information specifying a location of the processed document data, the processed document data being processed and stored by the first service processing apparatus; and transmits, according to the process flow, information specifying the location of the processed document data to the second service processing apparatus to perform the second service processing operation to the processed document data;

the second service processing apparatus, on the basis of the information specifying the location of the processed data, retrieves the first modified document data.

2. A service processing device according to claim 1, wherein the controller also:

(3) sets the location of the document data and the contents of the plural service processing operations to be performed to the document data; and 4) creates, on the basis of set contents of the plural service processing operations, the script data for performing the plural service processing operations to the document data.

3. A service processing device according to claim 2, further comprising:

a memory that stores plural different items of script data; and wherein the controller selects at least one of the plural items of script data stored in the storage unit.

4. A service processing device according to claim 1, wherein the plural service processing operations at least include two or more of: a copy operation, a print operation, a scan operation, a facsimile transmission operation, a facsimile reception operation, an electronic mail delivery operation, a storing operation, a readout operation, an optical character recognition operation, and a noise removal operation.

5. A service processing device according to claim 1, wherein the script data at least includes one or more of: information expressing a relation among the plural service processing operations, interface information for invoking the plural service processing operations, and information for configuring a graphical user interface relating to the plural service processing operations.

6. a service processing device comprising:

interpreting means for interpreting contents of script data that describes a location of document data to be processed, contents of plural service processing operations to be performed to the document data, and process flow of the plural service processing operations; and linkage processing means for linking plural service processing units that are connected to a network with each other to perform the plural service processing operations to the document data on the basis of an interpretation result of the interpreted contents, wherein at least two of the service processing units each perform a different subset of the service processing operations, and wherein the plural service processing operations includes a first service processing operation to be performed to the document data by first service processing unit and a second service processing operation to be performed to the document data by second service processing unit, the first and second service processing operations being different types of operations, the document data being processed by the first service processing operation to produce first modified document data, the first modified document data being processed by the second service processing operation to produce second modified document data;

transmits, according to the process flow, information specifying the location of the document data to the first service processing unit to perform the first service processing operation to the document data;

receives, from the first service processing unit, information specifying a location of the processed document data, the processed document data being processed and stored by the first service processing unit; and transmits, according to the process flow, information specifying the location of the processed document data to the second service processing unit to perform the second service processing operation to the processed document data;

the second service processing unit, on the basis of the information specifying the location of the processed data, retrieves the first modified document data.

7. A service processing device according to claim 6, further comprising:

setting means for setting the location of the document data and the contents of the plural service processing operations to be performed to the document data; and creating means for creating, on the basis of setting contents set by the setting means, the script data for performing the plural service processing operations to the document data.

8. A service processing device according to claim 7, further comprising:

storage means for storing plural different items of script data; and selecting means for selecting at least one of the plural items of script data stored in the storage means.

9. A service processing device according to claim 6, wherein the plural service processing operations at least include two or more of: a copy operation, a print operation, a scan operation, a facsimile transmission operation, a facsimile reception operation, an electronic mail delivery operation, a storing operation, a readout operation, an optical character recognition operation, and a noise removal operation.

10. A service processing device according to claim 6, wherein the script data at least includes one or more of: information expressing a relation among the plural service processing operations, interface information for invoking the plural service processing operations, and information for configuring a graphical user interface relating to the plural service processing operations.

11. A service processing method comprising the steps of:
interpreting contents of script data that describes a location of document data be processed, contents of plural service processing operations to be performed to the document data, and process flow of the plural service processing operations; and
linking plural service processing units that are connected to a network with each other to perform the plural service processing operations to the document data on the basis of an interpretation result of the interpreted contents,
wherein at least two of the service processing units each perform a different subset of the service processing operations, and
the plural service processing operations includes a first service processing operation to be performed to the document data by first service processing unit and a second service processing operation to be performed to the document data by second service processing unit, the first and second service processing operations being different types of operations, the document data being processed by the first service processing operation to produce first modified document data,
the first modified document data being processed by the second service processing operation to produce second modified document data;
transmits, according to the process flow, information specifying the location of the document data to the first service processing unit to perform the first service processing operation to the document data;
receives, from the first service processing unit, information specifying a location of the processed document data, the processed document data being processed and stored by the first service processing unit; and
transmits, according to the process flow, information specifying the location of the processed document data to the second service processing unit to perform the second service processing operation to the processed document data;
the second service processing unit, on the basis of the information specifying the location of the processed data, retrieves the first modified document data.
the second service processing unit, on the basis of the information specifying the location of the processed data, retrieves the first modified document data.

12. A service processing method according to claim 11, further comprising:
setting the location of the document data and the contents of the plural service processing operations to be performed to the document data; and
creating, on the basis of setting contents set at the setting step, the script data for performing the plural service processing operations to the document data.

13. A service processing method according to claim 12, further comprising:
selecting at least one item of script data from plural different items of script data stored in a data storage unit.

14. A service processing method according to claim 11, wherein the plural service processing operations at least include two or more of: a copy operation, a print operation, a scan operation, a facsimile transmission operation, a facsimile reception operation, an electronic mail delivery operation, a storing operation, a readout operation, an optical character recognition operation, and a noise removal operation.

15. A service processing method according to claim 11, wherein the script data at least includes one or more of: information expressing a relation among the plural service processing operations, interface information for invoking the plural service processing operations, and information for configuring a graphical user interface relating to the plural service processing operations.

16. A service processing device comprising:
a controller that:
(1) interprets contents of script data that describes a location of document data be processed, contents of plural service processing operations to be performed to the document data, and process flow of the plural service processing operations;
(2) carries out at least one of the service processing operations to the document data on the basis of a result of the interpreted contents; and
(3) causes the service processing device to transmit the script to another service processing device for performing a next service processing operation after executing the at least one service processing operation,
wherein at least two service processing devices each perform a different subset of the service processing operations, and
wherein the plural service processing operations includes a first service processing operation to be performed to the document data by first service processing device and a second service processing operation to be performed to the document data by second service processing device, the first and second service processing operations being different types of operations, the document data being processed by the first service processing operation to produce first modified document data, the first modified document data being processed by the second service processing operation to produce second modified document data;
transmits, according to the process flow, information specifying the location of the document data to the first service processing device to perform the first service processing operation to the document data;
receives, from the first service processing device, information specifying a location of the processed document data, the processed document data being processed and stored by the first service processing device; and
transmits, according to the process flow, information specifying the location of the processed document data to the second service processing device to perform the second service processing operation to the processed document data;
the second service processing device, on the basis of the information specifying the location of the processed data, retrieves the first modified document data.

17. A service processing device according to claim 16, wherein the controller also:
(4) sets the location of the document data and the contents of the plural service processing operations to be performed to the document data; and
5) creates, on the basis of the set contents of the plural service processing operations, the script data for performing the plural service processing operations to the document data.

18. A service processing device according to claim 17, further comprising:

a memory that stores plural different items of script data; and wherein the controller selects at least one piece of the plural items of script data stored in the memory.

19. A service processing device according to claim 16, wherein the plural service processing operations at least include two or more of: a copy operation, a print operation, a scan operation, a facsimile transmission operation, a facsimile reception operation, an electronic mail delivery operation, a storing operation, a readout operation, an optical character recognition operation, and a noise removal operation.

20. A service processing device according to claim 16, wherein the script data at least includes one or more of: information expressing a relation among the plural service processing operations, interface information for invoking the plural service processing operations, and information for configuring a graphical user interface relating to the plural service processing operations.

21. A service processing device comprising:
interpreting means for interpreting contents of script data that describes a location of document data to be processed and contents of plural service processing operations to be performed to the document data, and process flow of the plural service processing operations;
executing means for carrying out at least one of the service processing operations to the document data on the basis of an interpretation result of the interpreted contents; and
transmission means for transmitting the script to another service processing device for performing a next service processing operation after the executing means executes the at least one service processing operation,
wherein at least two service processing devices each perform a different subset of the service processing operations, and
wherein the plural service processing operations includes a first service processing operation to be performed to the document data by first service processing device and a second service processing operation to be performed to the document data by second service processing device, the first and second service processing operations being different types of operations, the document data being processed by the first service processing operation to produce first modified document data, the first modified document data being processed by the second service processing operation to produce second modified document data;
transmits, according to the process flow, information specifying the location of the document data to the first service processing device to perform the first service processing operation to the document data;
receives, from the first service processing device, information specifying a location of the processed document data, the processed document data being processed and stored by the first service processing device; and
transmits, according to the process flow, information specifying the location of the processed document data to the second service processing device to perform the second service processing operation to the processed document data;
the second service processing devices, on the basis of the information specifying the location of the processed data, retrieves the first modified document data.

22. A service processing device according to claim 21, further comprising:

setting means for setting the location of the document data and the contents of the plural service processing operations to be performed to the document data; and
creating means for creating, on the basis of setting contents set by the setting means, the script data for performing the plural service processing operations to the document data.

23. A service processing device according to claim 22, further comprising:
storage means for storing plural different items of script data; and
selecting means for selecting at least one piece of the plural items of script data stored in the storage means.

24. A service processing device according to claim 21, wherein the plural service processing operations at least include two or more of: a copy operation, a print operation, a scan operation, a facsimile transmission operation, a facsimile reception operation, an electronic mail delivery operation, a storing operation, a readout operation, an optical character recognition operation, and a noise removal operation.

25. A service processing device according to claim 21, wherein the script data at least includes one or more of: information expressing a relation among the plural service processing operations, interface information for invoking the plural service processing operations, and information for configuring a graphical user interface relating to the plural service processing operations.

26. A service processing method to be performed on a service processing device, the method comprising the steps of:
interpreting contents of script data that describes a location of document data to be processed, contents of plural service processing operations to be performed to the document data, and process flow of the plural service processing operations;
carrying out at least one of the service processing operations to the document data on the basis of an interpretation result of the interpreted contents; and
transmitting, after execution of the at least one service processing operation is ended, the script to another service processing device for performing a next service processing operation,
wherein the plural service processing operations includes a first service processing operation to be performed to the document data by a first service processing device and a second service processing operation to be performed to the document data by second service processing device, the first and second service processing operations being different types of operations, the document data being processed by the first service processing operation to produce first modified document data, the first modified document data being processed by the second service processing operation to produce second modified document data;
transmits, according to the process flow, information specifying the location of the document data to the first service processing device to perform the first service processing operation to the document data;
receives, from the first service processing devices, information specifying a location of the processed document data, the processed document data being processed and stored by the first service processing device; and
transmits, according to the process flow, information specifying the location of the processed document data to the second service processing device to perform the second service processing operation to the processed document data;

the second service processing device, on the basis of the information specifying the location of the processed data, retrieves the first modified document data.

27. A service processing method according to claim 26, further comprising:
   setting the location of the document data and the contents of the plural service processing operations to be performed to the document data; and
   creating, on the basis of setting contents set at the setting step, the script data for performing the plural service processing operations to the document data.

28. A service processing method according to claim 27, further comprising:
   selecting at least one item of script data from plural different items of script data stored in a data storage unit.

29. A service processing method according to claim 26, wherein the plural service processing operations at least include two or more of: a copy operation, a print operation, a scan operation, a facsimile transmission operation, a facsimile reception operation, an electronic mail delivery operation, a storing operation, a readout operation, an optical character recognition operation, and a noise removal operation.

30. A service processing method according to claim 26, wherein the script data at least includes one or more of: information expressing a relation among the plural service processing operations, interface information for invoking the plural service processing operations, and information for configuring a graphical user interface relating to the plural service processing operations.

31. A service processing device comprising:
   a controller that:
   (1) interprets contents of scripts data that describes a location of document data to be processed, contents of plural service processing operations to be performed to the document data, and process flow of the plural service processing operations;
   (2) links plural service processing apparatus that are connected to a network with each other to perform the plural service processing operations to the document data on the basis of a result of the interpreted contents;
   wherein the plural service processing operations include a first service processing operation to be performed to the document data by a first service processing apparatus and a second service processing operation to be performed to the document data by second service processing apparatus, the first and second service processing operations being different types of operations, the document data being processed by the first service processing operation to produce first modified document data, the first modified document data being processed by the second service processing operation to produce second modified document data;
   transmits, according to the process flow, first instruction data to the first service processing apparatus to perform the first service processing operation to the document data;
   receives a result of the first service processing operation from the first service processing apparatus; and
   transmits, according to the process flow, second instruction data to the second service processing apparatus to perform the second service processing operation to the processed document data processed by the first service processing operation in response to receiving the result of the first service processing operation;
   the second service processing apparatus, on the basis of the information specifying the location of the processed data, retrieves the first modified document data.

32. The service processing device according to claim 31, wherein the first and second service processing operations include two of: a copy operation, a print operation, a scan operation, a facsimile transmission operation, a facsimile reception operation, an electronic mail delivery operation, a storing operation, a readout operation, an optical character recognition operation, and a noise removal operation.

* * * * *